United States Patent [19]

Elkins

[11] Patent Number: 5,670,121

[45] Date of Patent: Sep. 23, 1997

[54] PROCESS FOR CONTROLLING THE TEMPERATURE OF A FLUIDIZED BED REACTOR IN THE MANUFACTURE OF TITANIUM TETRACHLORIDE

[75] Inventor: Thomas Shields Elkins, Waverly, Tenn.

[73] Assignee: E. I. Du Pont de Nemours and Company, Wilmington, Del.

[21] Appl. No.: 435,686

[22] Filed: May 5, 1995

[51] Int. Cl.$^6$ ................................. C01G 23/00
[52] U.S. Cl. .................... 423/74; 423/79; 423/492; 423/DIG. 5; 423/DIG. 6
[58] Field of Search ............ 423/74, 79, DIG. 5, 423/DIG. 6, DIG. 16, 492; 395/906; 364/500

[56] References Cited

U.S. PATENT DOCUMENTS

| | | | |
|---|---|---|---|
| 2,701,179 | 2/1955 | McKinney | 423/74 |
| 2,790,703 | 4/1957 | Frey | 23/87 |
| 2,868,622 | 1/1959 | Bennett et al. | 423/79 |
| 3,086,843 | 4/1963 | Evans et al. | 423/74 |
| 3,312,529 | 4/1967 | Evano | 364/500 |
| 3,526,477 | 9/1970 | Wan | 23/202 |
| 3,573,000 | 3/1971 | Toomey et al. | 364/500 |
| 3,591,333 | 7/1971 | Carlson et al. | 423/492 |
| 3,781,533 | 12/1973 | Barnstone et al. | 364/500 |
| 3,854,876 | 12/1974 | Rankine et al. | 23/230 R |
| 4,264,566 | 4/1981 | Giles et al. | 423/DIG. 5 |
| 4,619,815 | 10/1986 | Robinson | 423/74 |
| 4,825,353 | 4/1989 | Jenkins | 364/500 |
| 4,854,972 | 8/1989 | Garrido et al. | 423/79 |
| 4,961,911 | 10/1990 | Reis et al. | 423/72 |
| 5,585,078 | 12/1996 | Reis et al. | 423/74 |

FOREIGN PATENT DOCUMENTS

| | | | |
|---|---|---|---|
| 62-046259A | 2/1987 | Japan. | |
| 271804 | 1/1967 | U.S.S.R. | 423/492 |
| 644141 | 8/1979 | U.S.S.R. | 423/79 |

*Primary Examiner*—Steven Bos

[57] ABSTRACT

This invention relates to a process for controlling the temperature of a fluidized bed reactor in the manufacture of titanium tetrachloride, wherein an exhaust gas stream comprising carbonyl sulfide, sulfur dioxide, carbon monoxide, carbon dioxide, and chlorine is formed. In the process, the exhaust gas stream is first analyzed to determine the analyzed concentration of carbonyl sulfide (or concentration ratio of carbonyl sulfide to sulfur dioxide), the desired concentration of carbonyl sulfide (or concentration ratio of carbonyl sulfide to sulfur dioxide) in the exhaust gas stream is determined, and the difference between the analyzed concentration of carbonyl sulfide (or concentration ratio of carbonyl sulfide to sulfur dioxide) and the desired concentration of carbonyl sulfide (or concentration ratio of carbonyl sulfide to sulfur dioxide) in the exhaust gas stream is then calculated. A signal is generated which corresponds to this difference and this signal provides a feedback response to the fluidized bed reactor for controlling the temperature of the fluidized bed reactor.

18 Claims, 1 Drawing Sheet

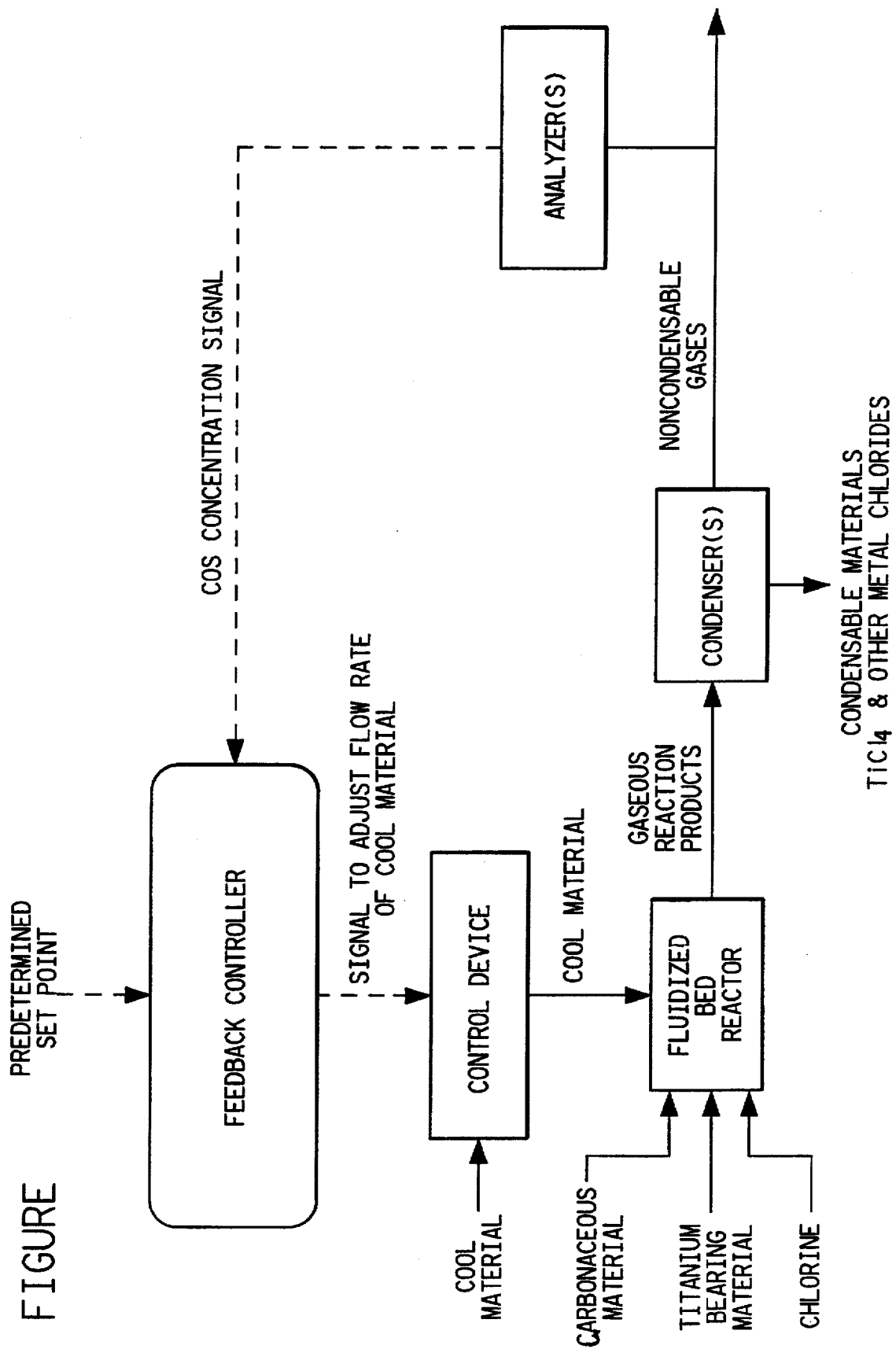
FIGURE

PROCESS FOR CONTROLLING THE TEMPERATURE OF A FLUIDIZED BED REACTOR IN THE MANUFACTURE OF TITANIUM TETRACHLORIDE

BACKGROUND OF THE INVENTION

This invention relates to process temperate control of a fluidized bed reactor used in the chlorination of titanium bearing materials by monitoring the concentration of carbonyl sulfide in an exhaust gas.

The process for chlorinating titanium containing materials in a fluidized bed reactor is known. Suitable processes are disclosed in the following U.S. Pat. Nos.: 2,701,179; 3,883,636; 3,591,333; and 2,446,181 which are hereby incorporated by reference. In such processes, particulate coke, particulate titanium bearing materials, chlorine and optionally oxygen or air are fed into a reaction chamber, and a suitable reaction temperature, pressure and flow rates are maintained to sustain the fluidized bed. Gaseous titanium tetrachloride and other metal chlorides are exhausted from the reaction chamber. The gaseous titanium tetrachloride so produced can then be separated from the other metal chlorides and exhaust gas and used to produce titanium dioxide or titanium metal.

In the chlorination process to prepare $TiCl_4$ in a fluidized bed reactor, it is desirable to reduce the formation of carbonyl sulfide (COS) from any sulfur present in the feed streams since removal of COS from the exhaust gas is difficult and costly. It is also desirable to minimize the formation of carbon monoxide (CO) so as to reduce carbon consumption in the reactor. Both COS and CO formation can be minimized by cooling the bed. Overcooling the bed is undesirable because (1) excessive formation of ferric chloride from iron impurities in the feed can occur, which increases chlorine consumption and (2) under some conditions, unreacted chlorine may exit the reactor which, if treatment, for example, in scrubbers is insufficient, can result in release of chlorine to the atmosphere which is a safety and environmental concern.

Direct measurement of temperature in the fluidized bed is costly and unreliable. First, thermocouples generally have a relatively short life time in the corrosive environment of the bed. Also, measurement of temperature in the bed can be inaccurate because the bed is so large that the entire bed will not have the same activity and therefore the entire bed will not be at the same temperature. Portions of the bed can be relatively inactive and may have considerably lower temperatures than others. Thermocouples have also been used in the top of the reactor to measure temperature. This is still a corrosive environment which can cause thermocouples to deteriorate relatively rapidly over time and still does not provide a reliable measurement of temperature of the bed on which to base a temperature control strategy. Further complicating the task of temperature control is the fact that the temperature at which the bed can become unreactive can vary due to factors such as the composition of the reactor bed and the distribution of chlorine.

A simple, reliable and economical basis for monitoring, controlling or optimizing temperature in a fluidized bed reactor for use in the chlorination of titanium bearing materials is therefore needed. Concomitantly, there is a need to reduce COS emissions, among others, from the reactor without incurring substantial cost for downstream abatement with incinerators or scrubbers. It is further desired to use the basis for monitoring temperature to create a feedback response which can be performed automatically or manually in response to changes that reflect increases or decreases in temperature outside of pre-established limits. The present invention meets these needs.

SUMMARY OF THE INVENTION

In accordance with this invention there is provided a process for temperature control of a fluidized bed reactor comprising the steps of:

(a) comparing a carbonyl sulfide concentration with a predetermined set point/range, wherein the carbonyl sulfide concentration is analyzed from an exhaust gas arising from chlorinating a titanium bearing material in a fluidized bed reactor; and (b) manipulating the fluidized bed reactor temperature until the carbonyl sulfide concentration is maintained within the predetermined set point/range.

A ratio of concentrations of carbonyl sulfide and sulfur dioxide can also be used.

The process is characterized by the following advantages which cumulatively render this process preferable to processes previously employed:

1. temperature control is achieved without direct measurement of the temperature of the fluidized bed;
2. use of carbonaceous material such as coke is more efficient since consumption to form wasteful products such as COS and CO in the fluidized bed reactor is minimized;
3. COS emissions are reduced;
4. need for manual control of temperature may be obviated;
5. high installation and operating costs associated with downstream abatement of the COS and CO formed in the fluidized bed reactor are avoided;
6. advantages 2 and 5 above are accomplished at maximum ferrous chloride concentrations so as to minimize ferric chloride production and hence minimize chlorine consumption and use of chlorine is more efficient; and
7. risk of over-cooling the reactor, which can result in release of unreacted chlorine to the atmosphere, is minimized.

It has been found that in the process of this invention COS concentration relates to both temperature and raw material utilization so that temperature does not need to be explicitly known and the relationship between COS concentration and bed temperature is surprisingly consistent and proportional even at low COS concentrations. It further has been discovered that use of carbon monoxide (CO) concentration in the exhaust gas to reflect temperature of the bed is unreliable since the CO concentration in the exhaust gas at which the reactor bed becomes unreactive varies depending on reactor conditions, and so CO concentration in the exhaust gas does not always vary proportionally with temperature.

BRIEF DESCRIPTION OF THE DRAWINGS

FIGURE sets forth an embodiment of this invention.

DETAILED DESCRIPTION

Carbonaceous material, titanium bearing material containing iron oxide, chlorine, and optionally oxygen or air are fed into a fluidized bed reactor. Typical conditions and specifications for fluidized beds useful for this invention are as follows: reaction temperature of about 900° C. to 1300° C., pressure of about 1–3 atmospheres, reactor with multiple jets in or near the base. Preferably, the point of introduction of the chlorine will be located within about 0–10 feet (about 0–3 m), more preferably about 0–8 feet (about 0–2.4 m), and most preferably about 0–5 feet (about 0–1.5 m) of the base of the reactor. A most preferred location is in the base of the reactor.

The titanium bearing material can be any suitable titanium source material such as titanium containing ores including rutile, ilmenite or anatase ore; beneficiates thereof; titanium containing byproducts or slags; and mixtures thereof. Ordinarily, the titanium bearing material contains iron oxide in the amount of about 0.5–50%, and preferably up to about 20% by weight.

Suitable carbonaceous material for use in this invention is any carbonaceous material which has been subjected to a coking process. Preferred is coke or calcined coke which is derived from petroleum or coal or mixtures of such cokes.

In the process of this invention, preferably the feed rates of the raw materials to the fluidized bed reactor, and the conditions of operation of the bed should be adjusted so that any iron oxide is substantially converted to ferrous chloride. (By substantially converted is meant that at least 50%, preferably at least 60%, and most preferably at least 70%, by weight, of the iron oxide in the titanium bearing material is converted to ferrous chloride.) The reason for this desired conversion is that to the extent iron oxide is allowed to react to the ferric state, additional quantities of chlorine will be required which will add additional cost to the process. Means for favoring the reaction to the ferrous state are well known, and most importantly involve not adding chlorine in substantial excess to that required to obtain the ferrous state. However, under certain circumstances it may be desirable to operate with substantial conversion, i.e. up to 85% of iron oxide to ferric chloride by adding excess chlorine.

Gaseous reaction products from the fluidized bed reactor are cooled in stages to first condense and remove iron and metal chlorides other than titanium tetrachloride. The remaining product from the reactor is then cooled to condense titanium tetrachloride leaving a non-condensable exhaust gas stream comprising $COS$, $SO_2$, $CO$, $CO_2$ and $Cl_2$. A portion or all of the exhaust gas stream, i.e., a sample stream is sent to an analytical device or analyzer such as a spectrometer, spectrophotometer and chromatograph. A sampling system may be required depending on the type of analyzer chosen, the condition of the exhaust gas and/or the placement of the analyzer. The analytical device can be in-line, meaning installed directly in the path of the exhaust gas stream or on-line, meaning a portion of the exhaust gas stream is directed away from the main process stream and toward the analytical device. The sample stream of the exhaust gas is analyzed for COS concentration or, in an alternative embodiment, a ratio of concentrations of COS and $SO_2$ is determined. The analysis of the gas stream is able to proceed quickly, continuously and quantitatively. Suitable means of analysis include, but are not limited to, spectroscopy, spectrometry and chromatography. Preferably a spectroscopic method is used to analyze the COS concentration of the exhaust gas. Most preferably, infrared spectroscopy and more particularly, Fourier transform infrared spectroscopy is used as the analytical method. Optionally, any portion of the sample stream can be returned to the exhaust gas stream, if desired, or sent to a process ventilation system.

A first signal (electrical, pneumatic, digital, etc.) is generated from the analysis which is related to the COS concentration in the exhaust gas, or COS and $SO_2$ concentrations in the exhaust gas or ratio of COS and $SO_2$ concentrations in the exhaust gas (collectively referred herein as a "controlled variable"). The signal relating to the controlled variable proceeds to a control system (such as a distributed control system or other feedback control system) where its value is compared to a set point or determined if it is within a set range. This set point/range is a predetermined or a preset value meaning it is a desired COS concentration or desired ratio of COS and $SO_2$ concentrations. The COS concentration is dependent on the total concentration of sulfur in the exhaust gas (as $SO_2$ and COS) which further depends on the sulfur content of the feed. Typically, about 0–2.5 mole % of the total gases in the noncondensable exhaust gas stream will be sulfur compounds. Subtracting from 0–2.5 mole % the COS concentration can provide the $SO_2$ concentration. Under these conditions the full range of concentration of COS is about 0 to about 2.5 mole %, preferably about 0–1.5 mole % and more preferably about 0–1 mole %, corresponding to about 2.5 to about 0 mole % $SO_2$, preferably about 2.5–1.0 mole % $SO_2$ and more preferably 2.5–1.5 mole % $SO_2$, respectively. However, sulfur content can vary significantly, for example, based on the sulfur content of the feed, and these differences must be taken into account when determining a set point or set range for COS concentration in the exhaust gas.

The set range for COS concentration depends on the sulfur content of the feeds which subsequently determines the total concentration of sulfur in the exhaust gas. The COS concentration set range has the broad limits of about 1–20 mole % based on the total sulfur content of the exhaust gas. The set point can be any desired value within this range. Preferably, the COS concentration set range is 2–15 mole % and more preferably 5–10 mole % of the total sulfur content of the exhaust gas. It is important that the lower limit to the set range of COS concentration is not below the detectability limit of the analytical device being used. In the alternative embodiment, a set point/range providing upper and lower limits to the $COS:SO_2$ ratio is used for comparison with the ratio determined by the analytical device or by the feedback controller.

As described above, it may be desirable to operate so that iron oxide is substantially converted to ferric chloride, and excess chlorine favors ferric chloride production. In this alternative embodiment, COS concentration and $Cl_2$ concentration are analyzed from the exhaust gas. The set point for COS concentration in this embodiment is below the detectability limit. The set range for $Cl_2$ concentration is typically about 0.3–1.0 mole %.

If the controlled variable does not equal the set point or is outside of the set range, then the difference between the measured controlled variable and set point concentration or concentration range limitation is determined. A second signal (electrical, pneumatic, digital, etc.) corresponding to this difference is generated either manually or by a suitable feedback controller such as, for example, a proportional integral or a proportional integral derivative action controller or other suitable computer software or algorithm that provides a feedback response, which causes a change in the amount of a cool material being added to the bed by making a proportional change in the flow rate of the cool material to the fluidized bed reactor. With automatic and continuous monitoring of the controlled variable, the amount of the cool material added to the fluidized bed reactor can be changed until the controlled variable reaches the set point or is within the set range, as specified for the process.

If the concentration of COS in the exhaust gas is determined to be outside of the set range, appropriate changes to the amount of the cool material being added to the bed will be implemented. For example, if it is found that the COS concentration is above the set point or above the set range upper limit, the amount of the cool material being added to the bed will be increased by an amount proportional to the amount of COS above the upper limit or set point.

The cool material added to control the temperature of the bed can be any cool material that does not substantially adversely impact the production of the desired products. By way of example, cool material includes titanium tetrachloride, nitrogen, carbon dioxide or the like. Mixtures of cool material are contemplated equivalents. The preferred cool material is titanium tetrachloride. Especially preferred is titanium tetrachloride that has been condensed and partially purified from the exhaust stream. The liquid $TiCl_4$ may undergo partial purification for example, by being vaporized and recondensed several times to assist in removing traces of other metal chlorides and entrained solids. In this embodiment, a portion of the $TiCl_4$ stream is recycled to the fluidized bed reactor and introduced into the bed or at or near the top of the bed through an injection nozzle. The flow rate of the recycled $TiCl_4$ is controlled by a suitable valve or other device whose setting is dependent upon the controlled variable.

The cool material, preferably titanium tetrachloride, which is added to the fluidized bed reactor should be introduced into the bed or at or near the surface of the fluidized bed. Preferably, the cool material will be introduced within about 0–10 feet (about 0–3 m), more preferably about 0–8 feet (about 0–2.4 m), and most preferably about 0–5 feet (0–1.5 m) of the surface of the bed. Thus, the cool material can be introduced into or at about the surface of the bed or above or below the surface of the bed, within about the foregoing ranges. An especially preferred embodiment is to add $TiCl_4$ up to about 10 feet above the surface of the bed. The $TiCl_4$ above the bed will cause cooling of the fluidized bed by falling into and mixing with the solids of the fluidized bed and then volatilizing to its gaseous form and heating to the temperature of the product gases.

The temperature of the cool material will vary depending upon the cool material selected but can range from about −196° C. to 150° C. If the cool material is titanium tetrachloride, the temperature is about 50° C. to 140° C. Optionally, sufficient chlorine could be added to the fluidized bed according to the technique described in U.S. Pat. No. 4,961,911, the teachings of which are incorporated herein by reference. Sufficient chlorine may be added through a separate injection nozzle in conjunction with the cool material. It has been found that sufficient $Cl_2$ also decreases COS concentration.

The amount of cool material added into the bed or above or below the fluidized bed reactor is controlled by the flow rate which is determined by a feedback response to an analytical signal generated by an analytical device which quantitatively determines the controlled variable. The cool material is introduced to the bed through any suitable means. A control device such as a valve can increase or decrease the flow rate of the cool material to the bed based on the analytical signal corresponding to the controlled variable. Alternatively, the flow rate of the cool material can be controlled manually based on the controlled variable read from the analytical device or the control system or by a human operator. Preferably, the flow rate adjustment of the cool material is carried out by automatic control, i.e., by commercially available instruments/computer hardware and software. Selecting optimized analyzer ranges, cooling material flow requirement and controller tuning can be routinely determined by one of ordinary skill in the art. In an alternative embodiment, any suitable means such as a heat exchanger could be used to manipulate the reactor temperature. This can be accomplished by a number of means known to one of ordinary skill in the art such as coils embedded in the fluidized bed, around the walls of the reactor or by circulating the bed material through an external cooling device.

Very rarely is it necessary to increase the temperature in the fluidized bed reactor. To increase temperature, additional oxygen (as $O_2$, air or other oxygen containing gas) can be added to the fluidized bed reactor or chlorinating gas. Added oxygen reacts with carbon in the reactor bed releasing more heat which increases temperature. Minor decreases in temperature as determined by decreases in COS concentration below the set point or lower limit of the set range can be controlled by reducing the mount of the cool material being added to the bed proportionally as long as the COS concentration is above the detectability limit.

COS concentration is discovered to be a reliable indicator of optimum bed temperature which allows temperature to be efficiently controlled by suitable manipulation of a cooling system.

FIGURE

FIGURE is a flow chart setting forth an embodiment of this invention. With reference to FIGURE, raw materials comprising carbonaceous material, titanium bearing material and chlorine are added to the fluidized bed reactor. The gaseous reaction products are cooled to condense typically $TiCl_4$ and other metal chlorides leaving non-condensable gases which are analyzed for COS concentration by infrared spectroscopy. A first signal indicative of the concentration of COS proceeds to the feedback controller via electrical connections where its value is compared to the desired COS concentration, i.e., predetermined set point. If a difference exists, a second signal corresponding to this difference is sent to a control device via electrical connections where the flow rate of a cool material injected above the fluidized bed reactor is adjusted accordingly until the COS concentration is within the predetermined set point.

To give a clearer understanding of the invention, the following example is construed as illustrative and not limitative of the underlying principles of the invention in any way whatsoever.

EXAMPLE

Experimentation was carried out in a plant to demonstrate one advantageous effect of automated COS control. COS emissions were evaluated over a 22 month period. Eleven months without COS control for comparison and 11 months with automated COS control were observed. The average of each 11 month period is provided in Table 1.

TABLE 1

| Weight units of COS exiting the fluidized bed reactor per weight units $TiO_2$ produced from $TiCl_4$ exiting the reactor |
|---|
| With CO control (Comparative) |
| 33.3 |
| Weight units of COS exiting the fluidized bed reactor per weight units $TiO_2$ produced from $TiCl_4$ exiting the reactor |
| With COS control (Present Invention) |
| 19.6 |

This demonstrates on average a 41% reduction in COS emissions obtained by the present invention.

From the foregoing description, one skilled in the art can easily ascertain the essential characteristics of the invention, and without departing from the spirit and scope thereof, can make various changes and modification of the invention to adapt it to various usages and conditions.

Having thus described and exemplified the invention with a certain degree of particularity, it should be appreciated that the following claims are not to be limited but are to be afforded a scope commensurate with the wording of each element of the claims and equivalents thereof.

What is claimed is:

1. In a process for controlling the temperature of a fluidized bed reactor in the manufacture of titanium tetrachloride, wherein the manufacture of titanium tetrachloride comprises the steps of feeding carbonaceous material, titanium bearing material, and chlorine, wherein at least one of these materials contains sulfur, to a fluidized bed reactor to form titanium tetrachloride and an exhaust gas stream comprising carbonyl sulfide, sulfur dioxide, carbon monoxide, carbon dioxide, and chlorine, the improvement comprising the steps of:

(a) analyzing the exhaust gas stream to determine the analyzed concentration of carbonyl sulfide in the exhaust gas stream, (b) determining the desired concentration of carbonyl sulfide in the exhaust gas stream, (c) calculating the difference between the analyzed concentration of carbonyl sulfide and the desired concentration of carbonyl sulfide in the exhaust gas stream;

(d) generating a signal which corresponds to the difference calculated in step (c) and provides a feedback response to the fluidized bed reactor to control the temperature of the fluidized bed reactor.

2. The process of claim 1, wherein the analyzed concentration of carbonyl sulfide is greater than the desired concentration of carbonyl sulfide in the exhaust gas stream.

3. The process of claim 1, wherein the analyzed concentration of carbonyl sulfide is less than the desired concentration of carbonyl sulfide in the exhaust gas stream.

4. The process of claim 1, wherein the manufacture of titanium tetrachloride further comprises the step of introducing a cool material into the fluidized bed reactor.

5. The process of claim 4, wherein the cool material is selected from the group consisting of titanium tetrachloride, nitrogen, carbon dioxide, and mixtures thereof.

6. The process of claim 5, wherein the cool material is titanium tetrachloride.

7. The process of claim 4, wherein the analyzed concentration of carbonyl sulfide is greater than the desired concentration of carbonyl sulfide in the exhaust gas stream and the feedback response comprises increasing the amount of cool material being introduced into the fluidized bed reactor.

8. The process of claim 4, wherein the analyzed concentration of carbonyl sulfide is less than the desired concentration of carbonyl sulfide in the exhaust gas stream and the feedback response comprises decreasing the amount of cool material being introduced into the fluidized bed reactor.

9. The process of claim 1 or 4, wherein the analyzed concentration of carbonyl sulfide is less than the desired concentration of carbonyl sulfide in the exhaust gas stream and the feedback response comprises introducing an oxygen-containing gas into the fluidized bed reactor.

10. In a process for controlling the temperature of a fluidized bed reactor in the manufacture of titanium tetrachloride, wherein the manufacture of titanium tetrachloride comprises the steps of feeding carbonaceous material, titanium bearing material, and chlorine, wherein at least one of these materials contains sulfur, to a fluidized bed reactor to form titanium tetrachloride and an exhaust gas stream comprising carbonyl sulfide, sulfur dioxide, carbon monoxide, carbon dioxide, and chlorine, the improvement comprising the steps of:

(a) analyzing the exhaust gas stream to determine the analyzed concentration ratio of carbonyl sulfide to sulfur dioxide in the exhaust gas stream, (b) determining the desired concentration ratio of carbonyl sulfide to sulfur dioxide in the exhaust gas stream, (c) calculating the difference between the analyzed concentration ratio of carbonyl sulfide to sulfur dioxide and the desired concentration ratio of carbonyl sulfide to sulfur dioxide in the exhaust gas stream;

(d) generating a signal which corresponds to the difference calculated in step (c) and provides a feedback response to the fluidized bed reactor to control the temperature of the fluidized bed reactor.

11. The process of claim 10, wherein the analyzed concentration ratio of carbonyl sulfide to sulfur dioxide is greater than the desired concentration ratio of carbonyl sulfide to sulfur dioxide in the exhaust gas stream.

12. The process of claim 10, wherein the analyzed concentration ratio of carbonyl sulfide to sulfur dioxide is less than the desired concentration of carbonyl sulfide to sulfur dioxide in the exhaust gas stream.

13. The process of claim 10, wherein the manufacture of titanium tetrachloride further comprises the step of introducing a cool material into the fluidized bed reactor.

14. The process of claim 13, wherein the cool material is selected from the group consisting of titanium tetrachloride, nitrogen, carbon dioxide, and mixtures thereof.

15. The process of claim 14, wherein the cool material is titanium tetrachloride.

16. The process of claim 13, wherein the analyzed concentration ratio of carbonyl sulfide to sulfur dioxide is greater than the desired concentration ratio of carbonyl sulfide to sulfur dioxide in the exhaust gas stream and the feedback response comprises increasing the amount of cool material being introduced into the fluidized bed reactor.

17. The process of claim 13, wherein the analyzed concentration ratio of carbonyl sulfide to sulfur dioxide is less than the desired concentration ratio of carbonyl sulfide to sulfur dioxide in the exhaust gas stream and the feedback response comprises decreasing the amount of cool material being introduced into the fluidized bed reactor.

18. The process of claim 10 or 13, wherein the analyzed concentration ratio of carbonyl sulfide to sulfur dioxide is less than the desired concentration ratio of carbonyl sulfide to sulfur dioxide in the exhaust gas stream and the feedback response comprises introducing an oxygen-containing gas into the fluidized bed reactor.

* * * * *